United States Patent
Chiang et al.

(10) Patent No.: US 8,321,175 B2
(45) Date of Patent: Nov. 27, 2012

(54) RESILIENCE AND DISPLACEMENT MEASURING DEVICE AND METHOD

(75) Inventors: Chung-Chien Chiang, Taichung County (TW); Chang-Hsiung Chen, Taichung (TW); Hsing-Cheng Chang, Taichung (TW); Shu-Chun Liao, Taichung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 490 days.

(21) Appl. No.: 12/563,506

(22) Filed: Sep. 21, 2009

(65) Prior Publication Data

US 2010/0286947 A1 Nov. 11, 2010

(30) Foreign Application Priority Data

May 11, 2009 (TW) .............................. 98115488 A (51) Int. Cl.
*G01B 11/14* (2006.01)
*G06F 17/40* (2006.01)

(52) U.S. Cl. .............. 702/150; 702/41; 702/42; 702/43; 356/614; 73/760

(58) Field of Classification Search ................... 702/150, 702/40–42, 43, 159
See application file for complete search history.

(56) References Cited

U.S. PATENT DOCUMENTS

| | | | |
|---|---|---|---|
| 5,205,147 A * | 4/1993 | Wada et al. ..................... 72/429 |
| 6,839,957 B1 | 1/2005 | Sticht | |
| 7,512,502 B1 * | 3/2009 | Yoshida ......................... 702/42 |
| 2006/0225505 A1 * | 10/2006 | Mitsuhashi ................ 73/514.18 |
| 2008/0095483 A1 * | 4/2008 | Duret et al. ................... 384/448 |

FOREIGN PATENT DOCUMENTS

| | | |
|---|---|---|
| CN | 1837748 | 9/2006 |
| CN | 1986928 | 6/2007 |

OTHER PUBLICATIONS

Translation of China Office action, issued on Oct. 19, 2011.*
Translation of CN 1986928, Jun. 27, 2007.*

* cited by examiner

*Primary Examiner* — Hal Wachsman
(74) *Attorney, Agent, or Firm* — WPAT PC; Justin King (57) ABSTRACT

A resilience and displacement measuring device is configured with a shaft having a displacement detection module and a force detection module disposed respectively at the two ends thereof. When the shaft is moved for driving a probe of the force detection module to press on a tested press-key, a reflective panel in the displacement detection module will be caused to displace along with the moving of the shaft for allowing a light sensor to measure the displacement of the shaft, and at the same time the pressing of the probe on the press-key will force a detection film to deform for allowing a strain gauge to measure a resilience. The device is capable of dividing a measurement range into a plurality of sub-ranges while designing calculation models specifically for the sub-ranges, by that a precise distance can be obtained from the measured distance information of the calculation models.

14 Claims, 6 Drawing Sheets

RESILIENCE AND DISPLACEMENT MEASURING DEVICE AND METHOD

CROSS REFERENCE TO RELATED PATENT APPLICATION

This patent application claims a foreign priority over a Taiwan, R.O.C. patent application No. 098115488, filed on May 11, 2009.

FIELD OF THE INVENTION

The present invention relates to a technique for measuring a press-key, and more particularly, to a device and method capable of measuring resilience and relating displacement simultaneously.

BACKGROUND OF THE INVENTION

Nowadays, press-keys are frequently in many electronic devices, such as computer keyboards, cellular phones, telephones, and so on. For enhancing the typing comfort of the press-key, manufacturers must have a proper resilience mode relating to the typing of press-key that are concluded from many years of experiment so as to obtain measurements relating to the performance of the press-keys during manufacturing. Therefore, there are already many devices for measuring the resilience of press-keys that are currently available.

One of which is a resilience measurement instrument disclosed in TW Pat. Pub. No. 529714. Operationally, the measurement instrument being mounted on a buffer base is positioned on a motor-driven lifting board while enabling a probing rod of the measurement instrument to abut against a press-key, by that the resilience relating to the pressing keystroke as well as the raising keystroke of the press-key can be measured. Moreover, as the rotation speed of the motor used for driving the lifting board is designed to be controlled by several micro switches disposed on the buffer base, the resilience measurement not only can be performed rapidly and accurately, but also the operation of the resilience measurement can be performed reliably without being affected by human error.

Nevertheless, the aforesaid resilience measurement instrument may be sufficient for those press-keys only capable of moving linearly downward by pressing or raising linearly upward by resilience, but they might not be suitable for measuring wind instruments such as saxophone, since the press-keys of those musical instrument are configured to pivot around a shaft relating to their master bodies in a reciprocating manner so as to control the opening/closing of their sound holes. Thus, for those press-keys fitted on wind instruments, a measuring device capable of obtaining the relationship between the resilience and displacement of the press-keys is required as the measurement of only their resilience performances is not sufficient. Thus, it is in need of an improvement over the aforesaid resilience measurement instrument.

There is a displacement measuring technique disclosed in U.S. Pat. No. 6,839,957, entitled "Displacement Unit", which is a displacement unit using a hydraulic means for measuring displacement. It is noted that the displacement unit of the aforesaid U.S. patent uses a drive actuated by pressure fluid for driving a sliding component to move and then measure its displacement in consequence. However, since the size of the aforesaid displacement unit is too big and is not able to measure resilience, it is not suitable for measuring press-keys of wind instruments.

Moreover, since the press-key for those tube-like wind instruments are distributed on their circumferences at different radial angles, the devices such as the aforesaid displacement unit that are only capable of performing a displacement measurement along a direction perpendicular to their operation platforms are not suitable for measuring those musical instruments whose press-keys are disposed with different radial angles on their circumferences.

Therefore, it is common to use a retractable micro-force meter in cooperation with a scale measuring apparatus, or a large servo motor, to measure the press-keys of wind instruments for obtaining information relating to their resilience and displacement. However, such measurement is disadvantageous in its bulky size and high cost.

Although there is an alternative laser displacement measuring technique capable for the measurement, it is also too costly to operation as the laser distance meter can be very expensive.

SUMMARY OF THE INVENTION

The object of the present invention is to provide a portable device and method thereof, capable of measuring resilience and relating displacement simultaneously.

To achieve the above object, the present invention provides a resilience and displacement measuring device, which is configured with a movable shaft having a displacement detection module and a force detection module disposed respectively at the two ends thereof. The displacement detection module is configured with a light sensor and a reflective panel, in that one component selected from the light sensor and the reflective panel is mounted on the shaft while arranging another component on a platform of the measuring device at a position corresponding to the previous-selected device so as to enable the two components to work cooperatively to measure the displacement of the shaft. Moreover, the force detection module is configured with a detection film whereas the detection film is configured with a probe and a strain gauge respectively arranged on two opposite sides thereof, by that the strain gauge is enabled to measure a resilience according to the deform of the detection film as soon as the probe is pressing on a tested press-key.

When the shaft is driven to displace for enabling the probe to press upon the tested press-key, the displacement detection module and the force detection module are enabled to measure the displacement along with its consequent resilience simultaneously for obtaining a resilience characteristic relating to the tested press-key. Accordingly, the resilience and displacement measuring device can be a small-sized and portable device.

In addition, the present invention further provides a method utilizing the cooperation of an infrared sensor and a reflective panel for measuring displacement, which comprises the steps of: dividing a measurement range into a plurality of sub-ranges while designing calculation models specifically and respectively for each of the sub-ranges; analyzing a relative displacement information that is obtained by the cooperation between the infrared sensor and the reflective panel so as to select one sub-range from the plural sub-ranges according to a distance resulting from the analysis of the relative displacement information and thus select one calculation model corresponding to the selected sub-range; applying samples of distance information into the selected calculation model so as to obtain a distance value as a result of displacement measurement. Thereby, not only an accurate displacement measurement can be achieved, but also the cost of displacement can be comparatively reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
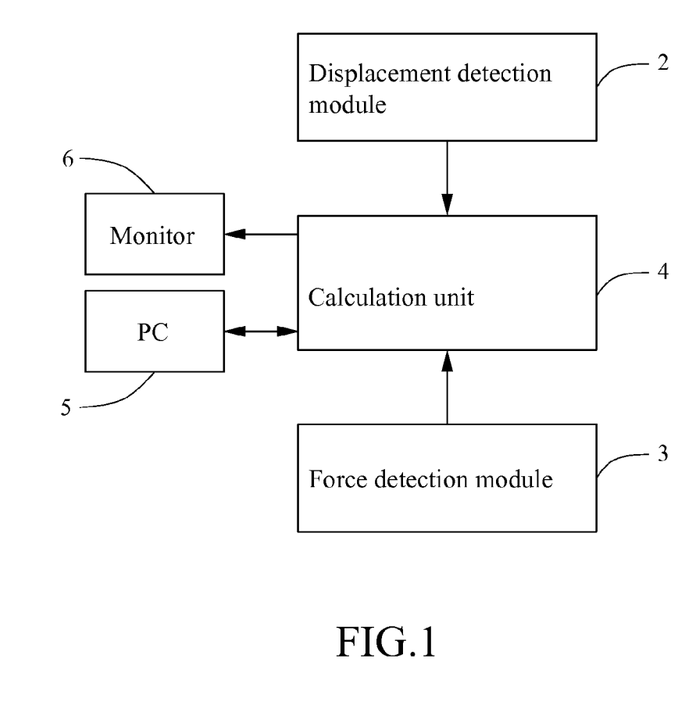
FIG. 1 is a block diagram showing a measuring device according to an embodiment of the invention.

Please refer to FIG. 1, which is a block diagram showing a measuring device according to an embodiment of the invention. In FIG. 1, the resilience and displacement measuring device is comprised of a displacement detection module 2 and a force detection module 3, in which the displacement detection module 2 and the force detection module 3 are enabled to perform an measurement operation upon a tested press-key in synchronization while transmitting the result of the measurement operation to a calculation unit 4 for processing, and then the calculation unit 4 will send the result of the processing to a computer 5 and a monitor 6 for displaying.

Figure 2:
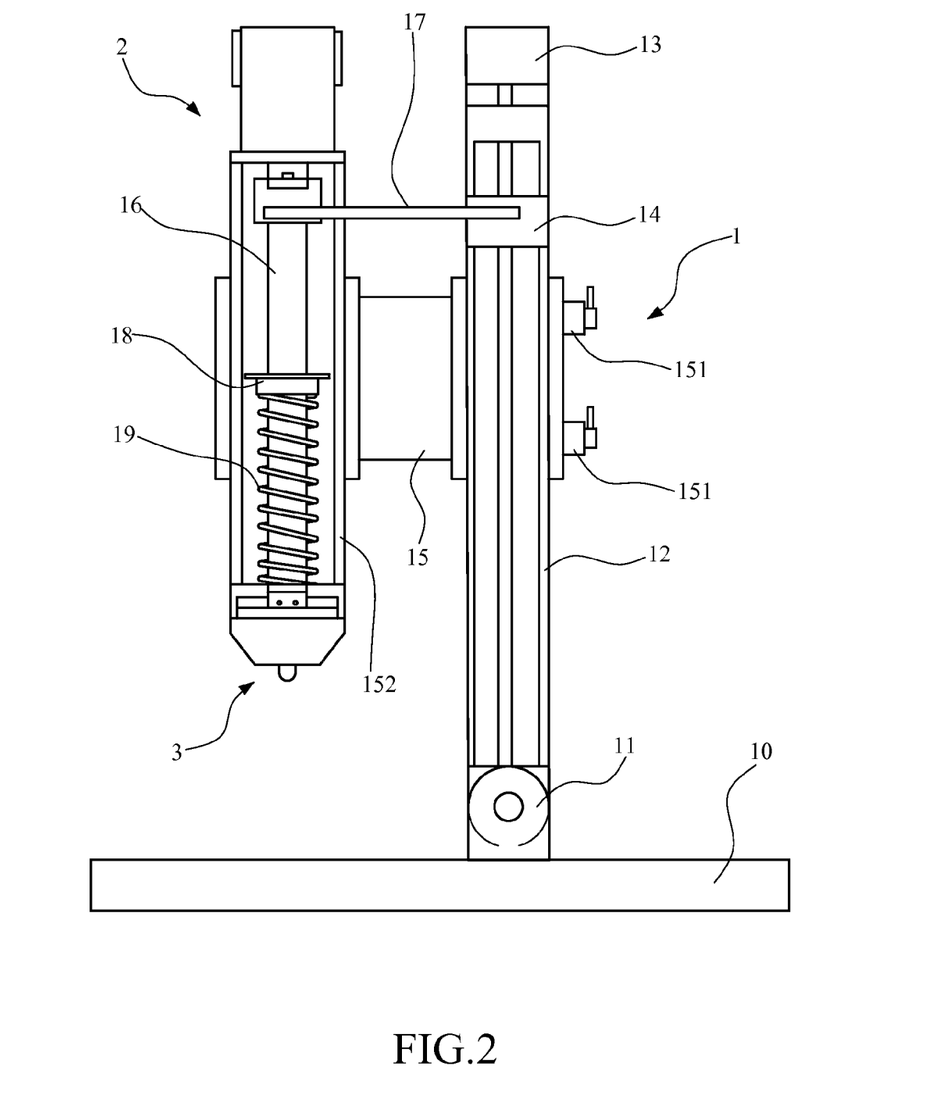
FIG. 2 is a schematic view of a measuring device according to the present invention.

Please refer to FIG. 2, which is a schematic view of a measuring device according to the present invention. In FIG. 2, the displacement detection module 2 and the force detection module 3 are coaxially disposed on a platform 1. The platform 1 is configured with a base 10 having a pivotal seat 11 formed thereon for a rail 12 to couple pivotally thereat so as to adjust the angle of the rail 12 by the pivoting of the pivotal seat 11. Moreover, the rail 12 is provided for a power source 13, such as a servo motor, and sliding block 14 to mounted thereon in a manner that the sliding block 14 is capable of being driven to move in a reciprocating manner by the power source 13. Operationally, the function of the rail 12, the power source 13 and the sliding block 14 can be achieved by the use of a linear sliding rail.

In addition, the rail 12 is further configured with a brace 15 that is disposed at the outer edge of the rail 12. As the brace 15 has a plurality of fasteners 151 arranged thereon at positions corresponding to the rail 12, the brace 15 is able to slide along the rail 12 when the plural fasteners 151 are loosed for adjusting the position thereof, and can be fixedly secured to the rail 12 when the plural fasteners 151 are fastened. Furthermore, there is a frame 152 provided for receiving and supporting a shaft 16 without obstructing the same from moving in the reciprocating manner as it is arrange at a side of the rail 12 opposite to the brace 15 while being positioned parallel with the rail 12. The shaft 16 and the sliding block 14 are connected by a linkage rod 17 for enabling the shaft 16 to move in synchronization with the sliding block 14; and further the shaft 16 is configured with a baffle 18 at the middle thereof, which is provided for a spring 19 to be arranged between the baffle 18 and the bottom of the brace 15 while sheathing the shaft 16 and thus for keeping the shaft 16 at a specific position by the elasticity of the spring. In this embodiment, the shaft 16 is maintained at a position on the top portion of the measuring device by the spring 19.

Figure 3:
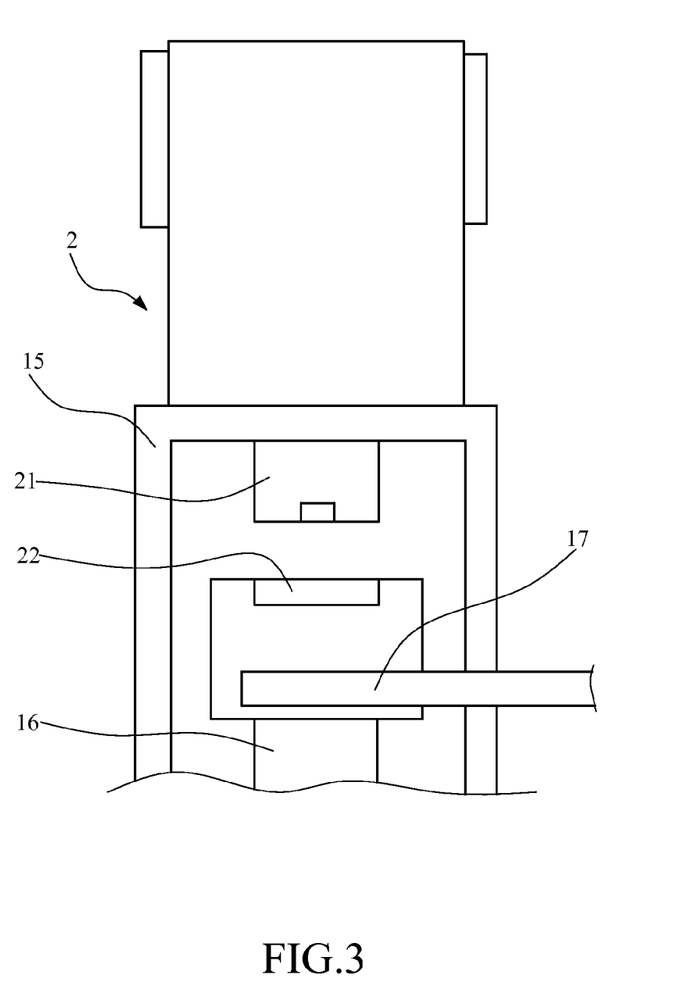
FIG. 3 is a schematic diagram showing a displacement detection module used in a measuring device according to the present invention.

Please refer to FIG. 3, which is a schematic diagram showing a displacement detection module used in a measuring device according to the present invention. In FIG. 3, the displacement detection module 2 has a light sensor 21 and a reflective panel 22 whereas the light sensor 21 is substantially an infrared sensor in this embodiment. In FIG. 3, the reflective panel 22 is disposed on a top surface of the shaft 16 while arranging the infrared sensor 21 on top of the brace 15 at a position corresponding to the reflective panel 22. In addition, the infrared sensor 21 is electrically connected to the calculation unit 4. Thereby, when reflective panel 22 is brought to move with the displacing of the shaft 16 in relative to the infrared sensor 21, the displacement of the reflective panel 22 that is caused by the moving of the shaft 16 can be obtained form the detection of the infrared sensor 21 with respect to the infrared reflection of the reflective panel.

Figure 4:
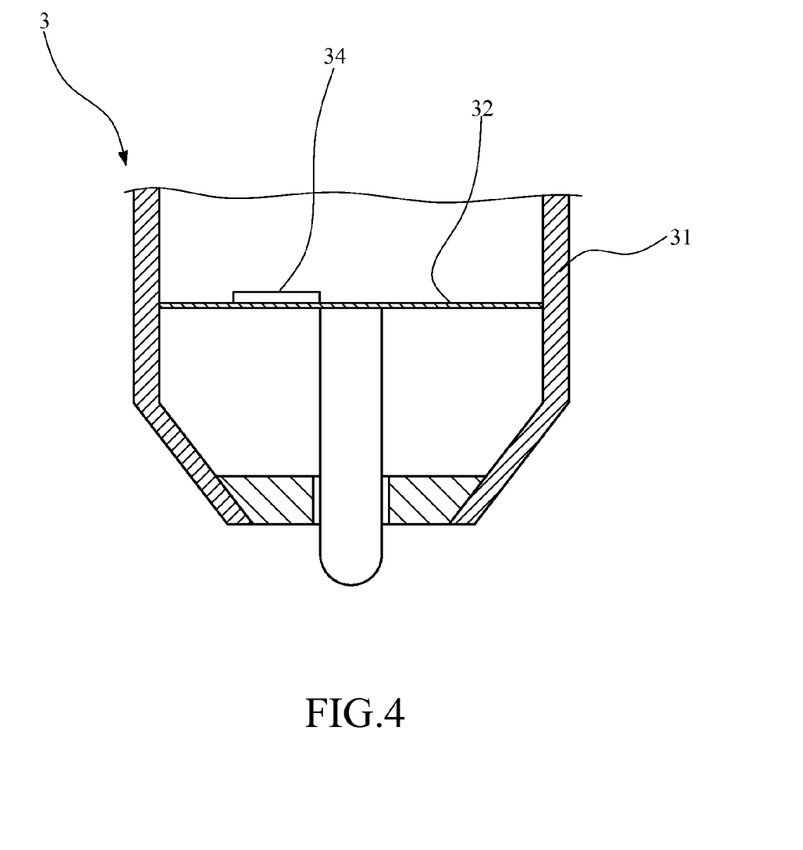
FIG. 4 is a schematic diagram showing a force detection module used in a measuring device according to the present invention.

Please refer to FIG. 4, which is a schematic diagram showing a force detection module used in a measuring device according to the present invention. In FIG. 4, the force detection module 3, being disposed at the bottom of the shaft 16, is configured with a frame 31 as the frame 31 is fixedly secured to the bottom of the shaft 16. There is a detection film 32 arranged inside the frame 31, which has a downward-extending probe formed at a bottom surface of the detection film 31 and a gauge 34 arranged at a top surface of the same. The gauge 34 is electrically connected to the calculation unit 4, so that the gauge 34 can be used for measuring resilience from the deformation of the detection film 32 resulting from the pressing of the probe 33 upon a tested press-key. In this embodiment, the force measuring range of the force detection module 3 is between 0~1000 g; while the detection film is a 30 mm×30 mm copper film, and the probe 33 is a light-weight glass fiber cylinder with high rigidity.

Figure 5:
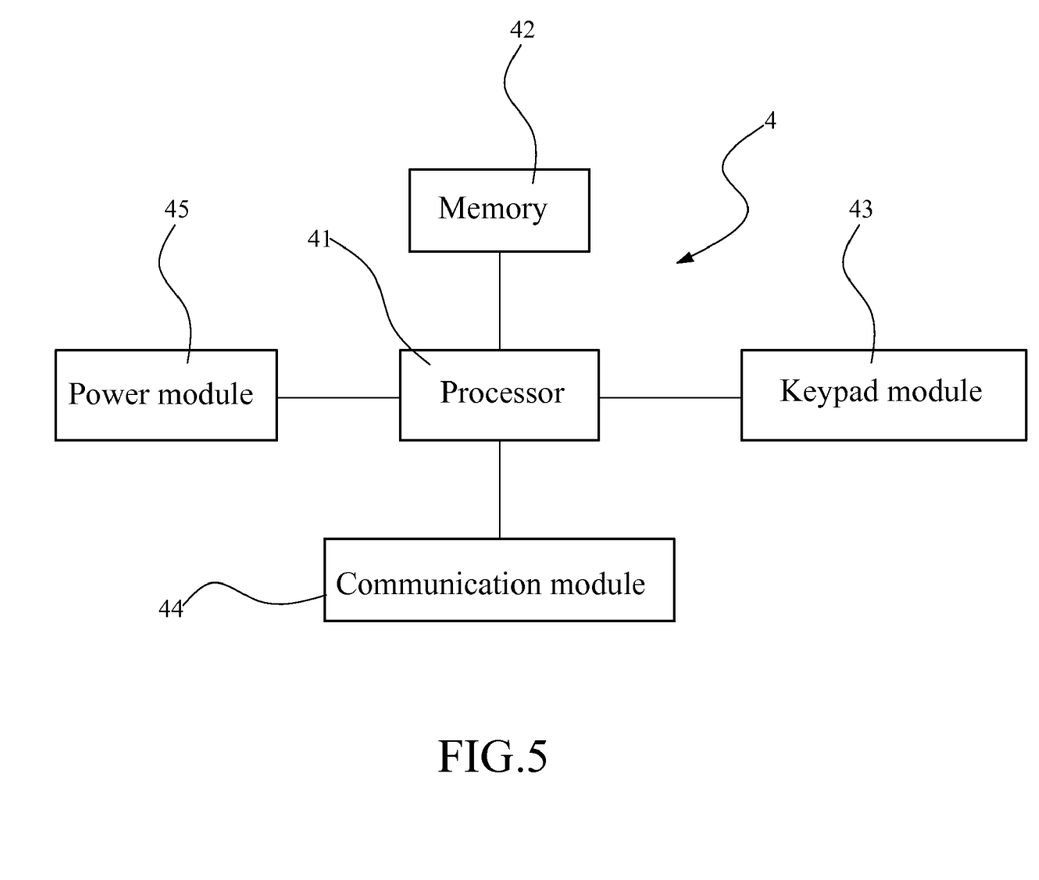
FIG. 5 is a block diagram showing a calculation unit of the invention.

Please refer to FIG. 5, which is a block diagram showing a calculation unit of the invention. In FIG. 5, the calculation unit 4 is composed of a processor 41, a memory 42, a keypad module 43, a communication module 44 and a power module 45, in which the processor 41 is used for receiving and performing a calculation upon information transmitted from the force detection module 3 and the displacement detection module 2; the memory 42 is used for storing the information relating to the measured displacement and resilience; the keypad module 42 is provided for an operator to input command for controlling the operation of the calculation unit 4;

the communication module 44 is used for connecting with an external device, e.g. it can be a RS232 serial communication port for connecting to the computer 5; and the power module 45 is used for providing power to the calculation unit 4.

For keeping the cost down, the aforesaid measuring device of the invention uses at least one infrared sensor for measuring displacement. However, since the profile of distance detection of the infrared sensor is not linear, it is in need of a displacement measuring method specifically designed for the aforesaid device so as to ensure satisfactory measurement accuracy.

Figure 6:
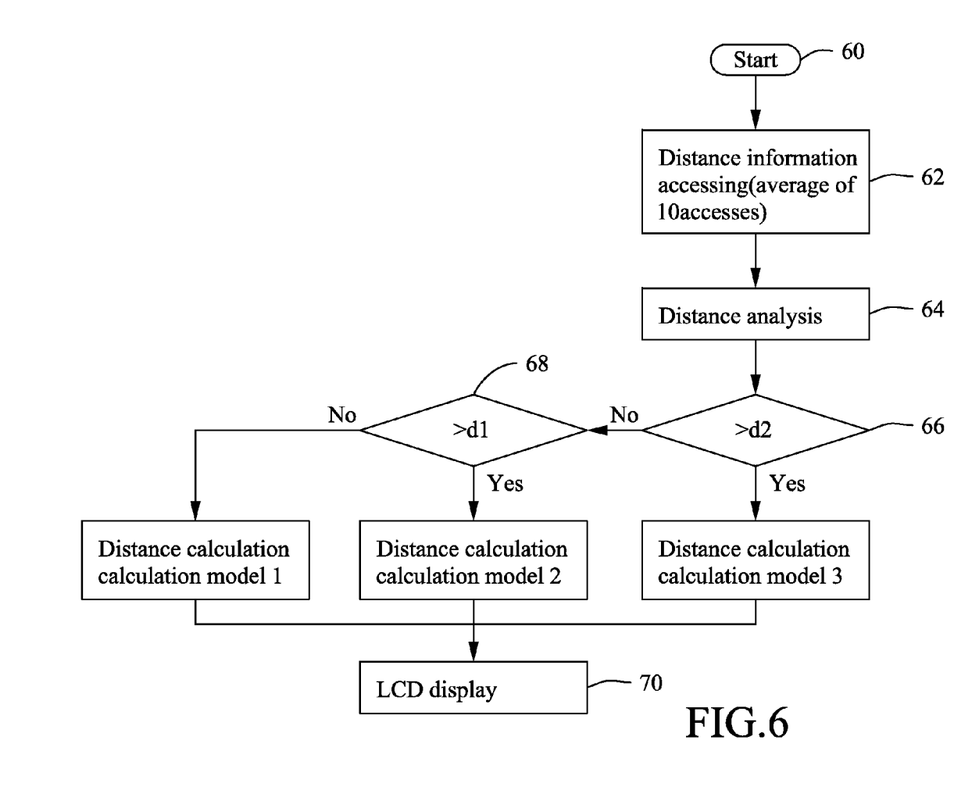
FIG. 6 is a flow chart depicting steps of a measuring method according to the present invention.

Therefore, the present invention further provides a displacement measuring method, and more particularly, a method utilizing an infrared sensor for measuring displacement, which comprises the following steps detailed in FIG. 6; the following processes occur after the process begins with step 60:

1. Distance information accessing (step 62)

In this step, a relative displacement information that is obtained by the cooperation between the infrared sensor 21 and the reflective panel 22 is accessed. Moreover, in order to enhance the accuracy of the measurement, an average value of ten accesses is used as the relative displacement information.

2. Distance analysis (step 64)

In this step, the relative displacement information is analyzed so as to select one sub-range from the plural sub-ranges according to a distance resulting from the analysis of the relative displacement information and thus select one calculation model corresponding to the selected sub-range.

However, since the profile of distance detection of the infrared sensor is not linear, the signal obtained in the measurement might be too weak when the measurement range is large which cause the quality of resolution to be poor. Thus, an addition amplification process is required for amplifying those weak measurement signals. Accordingly, it is intended to divide the measurement range into a plurality of sub-ranges while designing amplification circuits of different calculation models specifically and respectively for each of the sub-ranges to be used in the amplification process so as to achieve satisfactory measurement accuracy.

Taking the press-keys of a saxophone for instance, as the measurement range required to be measured by the aforesaid measuring device of the invention is not more than 40 mm, i.e. the stroke of the shaft 16 driven by the sliding block 14 is not more than 40 mm, such measurement range will be divided into three sub-ranges, i.e. d1, d2, and d3 ranged respectively between 0~15 mm, 15~30 mm and 30~40 mm; but is not limited thereby.

3. Distance calculation

In this step, samples of distance information are applied into the selected calculation model so as to obtain a distance value. For example, when the measurement range is 12 mm that is in the range of the sub-range d1, the calculation model 1 will be selected for the calculation; and when the measurement range is 22 mm that is in the range of the sub-range d2, the calculation model 2 will be selected for the calculation. Referring to FIG. 6, the measurement range is measured against the d2 sub-range (step 66), and if larger, calculation model 3 is selected, else the measurement range is measured against the d1 sub-range (step 68), and if larger, calculation model 2 is selected, else calculation module 1 is selected. Once a distance calculation is selected, the result of the processing is sent to a monitor (e.g., LCD display) for displaying (step 70).

Moreover, in this embodiment, the first calculation module 1 is defined by the following formula:

$$y = 17.10231 e^{\frac{-x}{20.27462}} + 17.10231 e^{\frac{-x}{186.75779}} - 4.27389;$$

the second calculation module 2 is defined by the following formula:

$$y = 34.12246 e^{\frac{-x}{129.2938}} + 97.64268 e^{\frac{-x}{28.79576}} - 10.3399;$$

and the third calculation module 3 is defined by the following formula:

$$y = 94.54813 - 0.43117x + 0.000695706 x^2;$$

where y represents a distance value, and x represents an 8-byte digital value from the detection of the displacement detection module 2.

When the measuring device of the invention is used for measurement, the tested object such as a saxophone is first being disposed on the base 10, and then the angle of the rail 12 is adjusted by the use of the pivot seat 11 for positioning the shaft in an angle about perpendicular to the pressing direction of the press-key of the tested object. Thereafter, the position of the brace 15 is adjusted for aligning the probe 33 of the force detection module 3 that is arranged at the front of the shaft 16 with the press-key.

Thereafter, when the sliding block 14 is driven to move downward along the rail 12 by the power moiled 13, it will trigger the linkage rod to bring the shaft 16 to move downward as well, and thereby, the probe will engage with and press upon the tested press-key. As soon as the tested press-key is being pressed completely, the power source 13 is reversed for driving the sliding block 14 as well as the linkage rod 16 to move upward until the probe 33 is detached from the press-key.

During the operation of the measuring device of the invention when the shaft 16 is brought to move downward for causing the probe 33 to press upon the tested press-key, the displacement measurement of the displacement detection module 2 as well as the resilience measurement of the force detection module will be performed simultaneously while transmitting the results of the measurements to the calculation unit 4 for processing, and then the calculation unit 4 will send the result of the processing to the monitor 6 for displaying and also to the computer 5 through the communication module 5 for storage.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A device for measuring resilience and displacement, comprising:
   a shaft, mounted on a platform with linkage such that enable the shaft moving in a reciprocating manner;
   a displacement detection module, configured with a light sensor and a reflective panel such that one component selected from the light sensor and the reflective panel is mounted on the shaft while arranging another component at a position corresponding to the selected component such that the two components work cooperatively to measure the displacement of the shaft; and a force detection module, disposed at an end of the shaft that is opposite to the displacement detection module and configured with a detection film having a probe and a strain gauge being respectively arranged on two opposite sides thereof for enabling the strain gauge to measure a resilience according to deformation of the detection film as soon as the probe is pressing on a tested press-key;

wherein, when the shaft is driven to displace for enabling the probe to press upon the tested press-key, the displacement detection module and the force detection module are enabled to measure the displacement and resilience simultaneously.

2. The measuring device of claim 1, wherein the reflective panel is disposed on a top surface of the shaft while arranging the light sensor at a position corresponding to the reflective panel.

3. The measuring device of claim 1, wherein the force detection module is fixedly secured at a bottom of the shaft and is further configured with a frame, provided for receiving the detection film therein.

4. The measuring device of claim 1, wherein the light sensor is substantially an infrared sensor.

5. The measuring device of claim 1, wherein:
the platform is further configured with a base having a rail disposed thereon providing a power source and sliding block mounted thereon;
the sliding block is driven to move in a reciprocating manner by the power source;
the rail is further configured with a brace extending from a side thereof to be provided for supporting the shaft without obstructing the sliding block, brace, and shaft from moving in the reciprocating manner, while the shaft is coupled to the sliding block by a linkage rod for enabling the shaft to move in synchronization with the sliding block; and
the shaft is configured with a baffle at the middle thereof and a spring arranged between the baffle and the bottom of the brace while sheathing the shaft, keeping the shaft at a specific position by elasticity of the spring.

6. The measuring device of claim 5, wherein the base is further configured with a pivotal seat, provided for the rail to couple pivotally thereat so as to adjust the angle of the rail by the pivoting of the pivotal seat.

7. The measuring device of claim 5, wherein the power source is a step motor.

8. The measuring device of claim 5, wherein:
the brace is disposed at the outer edge of the rail while being fixedly secured to the rail by a plurality of fasteners arranged on the brace at positions corresponding to the rail, and a frame provided for supporting the shaft without obstructing the shaft from moving in the reciprocating manner.

9. The measuring device of claim 1, further comprising:
a calculation unit, comprising:
a processor, for receiving and performing calculations based upon information transmitted from the force detection module and the displacement detection module;
a memory, for storing the information relating to the measured displacement and resilience;
a keypad module, provided for an operator to input command for controlling the operation of the calculation unit;
a communication module, for connecting with an external device; and
a power module, for providing power to the calculation unit.

10. The measuring device of claim 9, wherein the communication module is a RS232 serial communication port connecting to a computer and a display.

11. The device of claim 1, adapted for measuring resilience and displacement relating to the press-keys of wind instruments.

12. A method utilizing the cooperation of an infrared sensor and a reflective panel for measuring displacement, performed by an electro-mechanical device, comprising the steps of:
accessing displacement information obtained by the cooperation between the infrared sensor and the reflective panel indicating the relative displacement between the infrared sensor and the reflective panel;
dividing a measurement range defining a range of displacement motion into a plurality of sub-ranges, creating corresponding calculation models for each of the plurality of sub-ranges, analyzing a relative displacement information and selecting a corresponding one sub-range from the plurality of sub-ranges according to the displacement information, and selecting one calculation model corresponding to the selected sub-range;
using the selected calculation model so as to calculate a distance value based on the displacement information.

13. The displacement measuring method of claim 12, wherein:
the measurement range comprises three sub-ranges, d1, d2, and d3, where $d1 \leqq d2 \leqq d3$, indicating a first, second, and third degree of displacement; and
when a resulting distance from the analysis of the relative displacement information is in the sub-range of d1, a first calculation module is selected to perform a respective amplification process, when the resulting distance from the analysis of the relative displacement information is in the sub-range of d2, a second calculation module is selected to perform a respective amplification process, and when the resulting distance from the analysis of the relative displacement information is in the sub-range of d3, a third calculation module is selected to perform a respective amplification process.

14. The displacement measuring method of claim 13, wherein the measurement range is not more than 40 mm, the sub-range d1 is ranged between 0~15 mm, the sub-range d2 is ranged between 15~30 mm, the sub-range d3 is ranged between 30~40 mm, the first calculation module is defined by the following formula:

$$y = 17.10231 e^{\frac{-x}{20.27462}} + 17.10231 e^{\frac{-x}{186.75779}} - 4.27389,$$

the second calculation module is defined by the following formula:

$$y = 34.12246 e^{\frac{-x}{129.2938}} + 97.64268 e^{\frac{-x}{28.79576}} - 10.3399,$$

and
the third calculation module is defined by the following formula:

$y = 94.54813 - 0.43117x + 0.000695706x^2$;

where y represents the distance value and x represents a value of displacement detection obtained from the displacement information obtained from the infrared sensor and the reflective panel.

* * * * *